United States Patent
Lisenker et al.

(10) Patent No.: US 6,357,734 B1
(45) Date of Patent: Mar. 19, 2002

(54) SUSPENSION DAMPER WITH VEHICLE SPRING PRELOAD

(75) Inventors: Ilya Lisenker, Miamisburg; Patrick Neil Hopkins, West Carrollton; Richard Edward Longhouse, Dayton; William Charles Kruckemeyer, Beavercreek, all of OH (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 09/484,199

(22) Filed: Jan. 18, 2000

(51) Int. Cl.[7] ................................. F16F 9/32
(52) U.S. Cl. ................... 267/221; 188/312; 188/322.19
(58) Field of Search ................ 267/221, 34, 64.13, 267/64.15, 64.16, 121; 188/312, 322.19, 322.22, 298

(56) References Cited

U.S. PATENT DOCUMENTS

| | | | |
|---|---|---|---|
| 3,917,244 A | * 11/1975 | Peddinghaus | ................. 267/34 |
| 4,452,436 A | * 6/1984 | Gute | ..................... 267/64.15 |
| 5,580,034 A | * 12/1996 | Cheng | ..................... 267/221 |
| 5,706,920 A | 1/1998 | Pees et al. | .............. 188/322.17 |
| 5,711,514 A | * 1/1998 | Lu | ............................ 267/221 |
| 5,720,473 A | * 2/1998 | Thomas | ..................... 267/221 |

FOREIGN PATENT DOCUMENTS

JP   1-255733   * 10/1989

* cited by examiner

*Primary Examiner*—Robert J. Oberleitner
*Assistant Examiner*—Mariano Sy
(74) *Attorney, Agent, or Firm*—Robert M. Sigler

(57) ABSTRACT

A monotube damper and suspension spring assembly for a motor vehicle includes a tubular housing defining a chamber filled with damping fluid. A piston and piston rod reciprocate within the chamber. In order to compensate for volumetric changes of the chamber due to extension and retraction of the piston rod within the chamber, either the upper seal cover or lower bottom ring assembly is slidable within the housing. A preload is applied either to the housing or to the seal cover to thereby bias these elements to compensate for volumetric changes in the chamber.

6 Claims, 3 Drawing Sheets

SUSPENSION DAMPER WITH VEHICLE SPRING PRELOAD

TECHNICAL FIELD

This invention relates to a monotube suspension dampers for a vehicle suspension system that is preloaded by the vehicle suspension spring.

BACKGROUND OF THE INVENTION

Monotube gas charge dampers are conventionally used in vehicle suspension systems. These devices include a tubular housing connected to a wheel end assembly and filled with damping fluid, a piston slidably mounted in the tubular housing, and a piston rod secured to the piston. The piston rod extends from the tubular housing and is connected to the vehicle body. As the vehicle upon which the damper is mounted is driven, the piston and piston rod move within the tube, displacing the damping fluid, to thereby absorb road shocks and vibrations. Displacement of the piston and piston rod within the tube requires that the volume within the tube be compensated during this normal movement of the piston to accommodate extension and retraction of the piston rod. Heretofore, compensation has been accomplished by providing a gas cap which is slidably mounted within the tube and which responds to a gas pressure charge within a gas accumulator to move the gas cap within the tube to thereby provide volumetric compensation for the movement of the piston and piston rod within the tube and to thereby prevent cavitation. The gas cap also accommodates thermal expansion of the fluid and fluid loss. The gas cap and accumulator required on prior art dampers increases the length of the damper, thereby complicating packaging and installation of the damper on the vehicle, and is difficult to manufacture because of the high pressure gas charging that is required. A typical prior art damper of this type is disclosed in U.S. Pat. No. 5,706,920.

SUMMARY OF THE INVENTION

According to the invention, the gas cap and the accumulator necessary on prior art monotube suspension dampers is eliminated. According to one embodiment of the invention, the seal cover, which closes the upper end of the tube and through which the piston rod extends, is made slidable with respect to the tube. The seal cover is preloaded by the vehicle suspension spring. Accordingly, the weight of the vehicle body is applied to preload the seal cover, thereby providing the preload necessary to prevent cavitation. According to another embodiment of the invention, the bottom ring of the damper is moveable axially with respect to the tube. The vehicle suspension spring is connected to the tube to provide the necessary preload. Accordingly, because the gas cap and the accumulator are eliminated, the present invention has the advantage of providing a damper having a smaller overall length. Manufacturing is simplified since assembly of the damper is easier (since the gas cap and accumulator do not have to be charged with gas). Because of the higher preload force, cavitation during normal operation of the damper is substantially reduced.

DESCRIPTION OF THE PREFERRED EMBODIMENT

Figure 1:
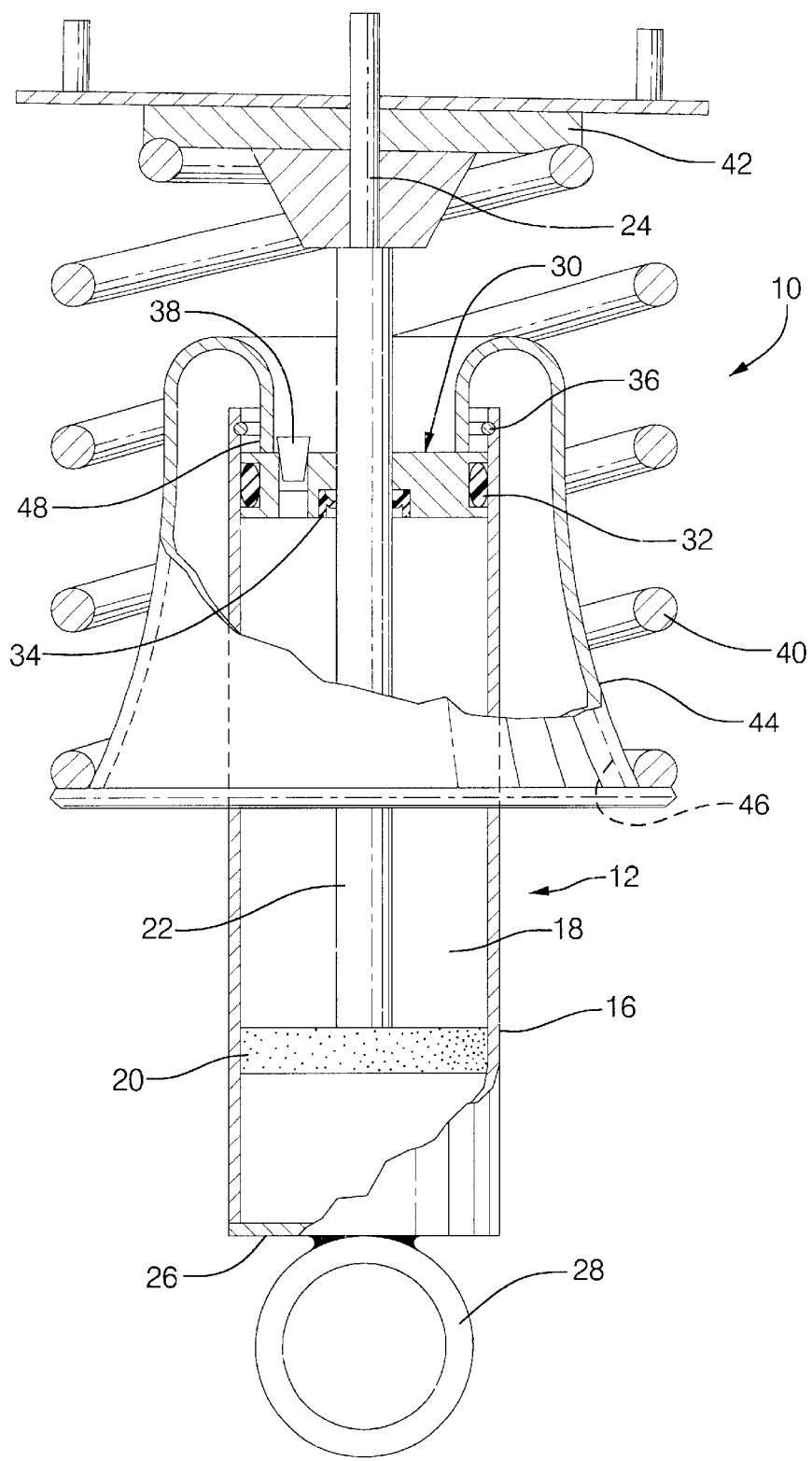
FIG. 1 is a schematic cross-sectional view of a monotube damper and suspension spring assembly made according to the teaching of the present invention.

Referring to FIG. 1, a monotube damper and suspension spring assembly generally indicated by the number 10 includes a damper generally indicated by the numeral 12 and a suspension spring generally indicated by the numeral 40. The damper 12 includes a tubular housing member 16. A piston 20 is slidably and sealingly received within tubular housing member 16 for movement relative thereto as will be hereinafter explained. A piston rod 22 extends upwardly (viewing FIG. 1) from the piston 20, and is integral with the piston 20. The upper end of the piston rod 22 is provided with a connecting mechanism 24 for connecting the piston rod 22 to the body of a vehicle (not shown). The lower end of the tubular housing member 16 terminates in a closed end 26, upon which a bottom ring assembly 28 is mounted, for securing the tubular housing member 16 to a wheel end assembly of the vehicle (not shown). The upper end of the tubular housing member is provided with a seal cover generally indicated by the numeral 30 which is slidable within the tubular housing member 16 toward and away from the closed end 26 and comprises a closure member to define, along with tubular housing member 16, a variable volume chamber 18 therewithin. A circumferentially extending seal 32 is carried by seal cover 30 and slidably and sealingly engages the wall of the tubular housing member 16. Another seal 34 is carried by seal cover 30 and slidably and sealingly engages the piston rod 22. A stop ring 36 is provided at the upper end of the tubular member 16 to retain the seal cover 30 within the tubular member 16. A plug 38 is provided to fill the chamber 18 with damping fluid, the plug preferably threaded or otherwise securely retained within seal cover 30. The damping fluid is metered across the piston 20 with orifices and/or blow-off valves as is known in the art, but not shown in FIG. 1, to dampen shocks and road vibrations during normal operation of the vehicle upon which the assembly 10 is installed.

The suspension spring 40 is preferably a conventional coiled spring which circumscribes the tubular housing member 16 and extends from an upper spring seat 42 which circumscribes the connecting mechanism 24 of the piston rod 22, and a lower spring seat generally indicated by the numeral 44. Spring seat 44 includes an outer circumferentially extending bearing surface 46 against which the lower coil of the spring 40 bears, and an inner circumferential bearing surface 48, which engages the seal cover 30. Accordingly, the force of the spring 40 biases the seal cover 30 downwardly viewing FIG. 1, toward the closed end 26 of the housing member 16.

In operation, during a compression stroke of the piston 20 and piston rod 22, the piston 20 slides downwardly, viewing FIG. 1, thereby increasing displacement of the piston rod 22 within the chamber 18. Accordingly, the increased volume of the piston rod 22 within the tubular housing member 16 must be accommodated by increasing the volume of the chamber 18 so that the volume containing the damping fluid is constant. As discussed above, prior art methods of accommodating this increased volume included providing a gas cap slidable within the tubular housing member 16 and a gas charged accumulator biasing the gas cap relative to the housing, to thereby accommodate the volumetric changes of the chamber 18 in response to movement of the piston rod 22. In this embodiment, the seal cover 30 is slidably mounted within the tubular housing member 16, and is preloaded by the suspension spring 40 acting through the lower spring seat 44, which is engaged with the seal cover 30 through the inner circumferential bearing surface 48. Accordingly, the preload is applied to the seal cover 30 through the transfer through the spring 40 of a portion of the weight of the vehicle body. During a compression stroke of the piston 20, the seal cover 30 is forced upwardly viewing FIG. 1. Correspondingly, during a retraction stroke of the piston 20, the spring 40 preloads the seal cover 30, thereby forcing the seal cover 30 downwardly to accommodate the decreased volume of the piston rod 22 within the chamber 18. The preload on the seal cover 30 by the spring 40 is sufficiently great that cavitation is prevented. Since the gas cap and accumulator have been eliminated, the overall length of the damper 12 is reduced, thereby facilitating accommodation of the damper within the space limitations of modern motor vehicles.

Figure 2:
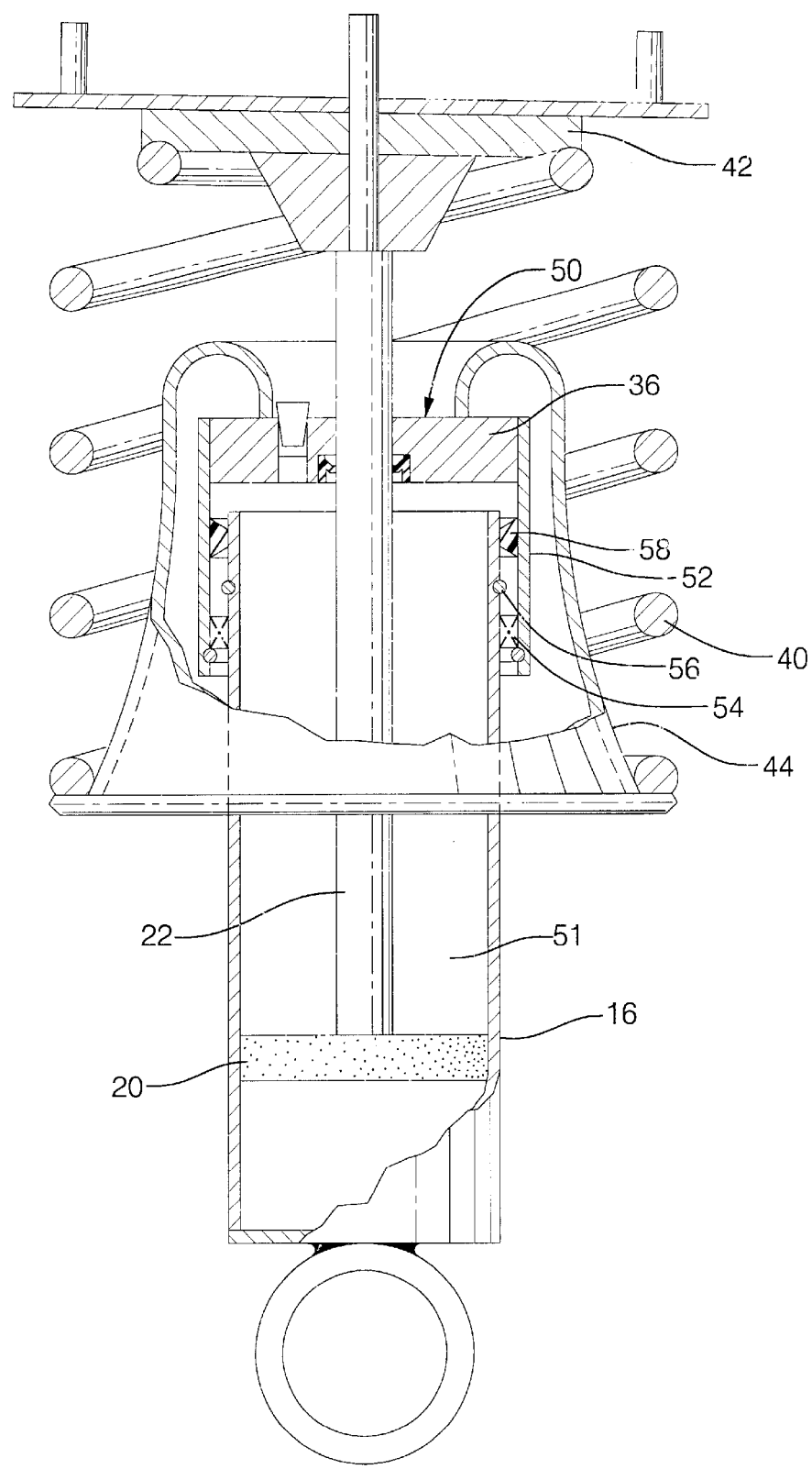
FIGS. 2 and 3 are views similar to FIG. 1, but illustrating additional embodiments of the present invention.

In the embodiment of FIG. 1 the seal cover 30 is slidably received within the chamber 18. In the alternate embodiment of FIG. 2, where elements the same or substantially the same as those of the embodiment of FIG. 1 retain the same reference character, a seal cover 50 is provided with a circumferentially extending cap 52, which circumscribes the outer surface of the tubular housing member 16 and thus comprises a closure member to define, with tubular housing member 16, a variable volume chamber 51 therewithin. The cap 52 is provided with a circumferentially extending bearing 54 to facilitate sliding and guiding of the cap 52 along the outer surface of the tubular housing member 16. A circumferentially extending stop ring 56 is provided to limit movement of the seal cover 50. A circumferentially extending seal of 58 slidably engages the outer circumferential surface of the tubular housing member 16. The lower spring seat 44 engages the seal cover 50.

Figure 3:
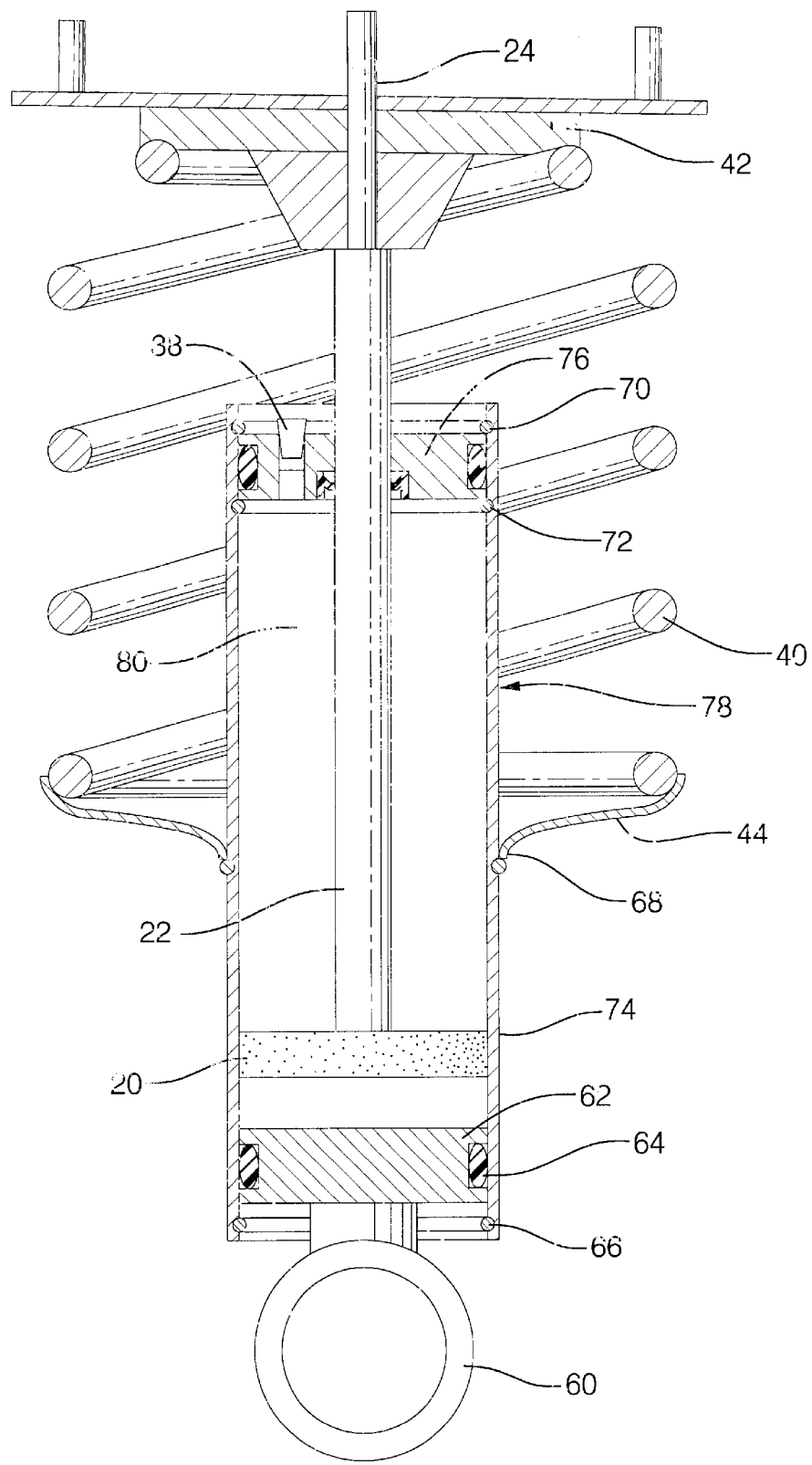

Referring now to the alternate embodiment of FIG. 3, in which elements the same or substantially the same as those of the embodiment of FIG. 1 retain the same reference character, the bottom ring assembly generally indicated by the numeral 60 includes a plunger 62 which is slidably received within a tube 74 and is provided with a circumferentially extending seal indicated by the numeral 64. Accordingly, the bottom ring assembly 60 is capable of sliding movement within the tube 74. Since the bottom ring assembly 60 is slidable relative to the tube 74, welding of the bottom ring assembly 60 to the housing is eliminated. Downward movement of the assembly 20 is stopped by a circumferentially extending a stop ring generally indicated by the numeral 66. The lower spring seat 44 defines an inner circumferential area 68 that is rigidly secure to the outer circumferential surface of the tube 74. A seal cover 76 is retained in place by retaining rings 70, 72 within the upper end of tube 74 so that tube 74 and seal cover 76 together comprise a tubular housing member 78. Plunger 62 comprises a closure member with respect to tubular housing member 78 and defines, with tubular housing member 78, a variable volume chamber 80 therewithin. Accordingly, the suspension spring 40 loads the tubular housing member 78 downwardly viewing the figure, thereby causing the plunger 62 to move within the tube 74 and thus adjust the volume of chamber 80 to compensate for volumetric changes due to extension and retraction of the piston 20 and piston rod 22, and also to compensate for fluid loss and thermal expansion of the fluid.

We claim:

1. A monotube damper and suspension spring assembly comprising:
    a tubular housing member having an open end,
    a closure member closing the open end and being axially slidable relative to the tubular housing member, the tubular housing member and closure member defining a variable volume chamber filled with damping fluid,
    a piston sealingly mounted in the tubular housing member and axially slidable relative to the tubular housing member and the closure member,
    a piston rod rigidly mounted on the piston and extending axially out of the chamber through a wall of one of the tubular housing member and the closure member, the piston rod being adapted for attachment to one of a body and a wheel apparatus of a vehicle,
    a first spring seat fixed relative to the piston rod outside the chamber,
    a second spring seat fixed relative to the one of the tubular housing member and closure member, the other of the tubular housing member and the closure member being adapted for attachment to the other of a body and a wheel apparatus of a vehicle, and
    a suspension spring compressible between the first and second spring seats when the assembly is attached between the body and a wheel apparatus of a vehicle to exert a preload force between the tubular housing member and closure member in direction to increase fluid pressure within the chamber.

2. The monotube damper and suspension spring assembly of claim 1 wherein the piston rod is adapted for attachment to a body of a vehicle and the other of the tubular housing member and the closure member is adapted for attachment to a wheel apparatus of the vehicle.

3. The monotube damper and suspension spring assembly of claim 2 wherein the second spring seat is fixed with respect to the closure member.

4. The monotube damper and suspension spring assembly of claim 2 wherein the second spring seat is fixed with respect to the tubular housing member.

5. The monotube damper and suspension spring assembly of claim 1 in which the second spring seat is fixed with respect to the closure member.

6. The monotube damper and suspension spring assembly of claim 1 wherein the second spring seat is fixed with respect to the tubular housing member.

* * * * *